United States Patent
Kushmerick et al.

(10) Patent No.: US 7,412,483 B2
(45) Date of Patent: Aug. 12, 2008

(54) AUTOMATED EMAIL ACTIVITY MANAGEMENT

(75) Inventors: Nicholas Kushmerick, Dublin (IE); Tessa Ann Lau, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 11/031,119

(22) Filed: Jan. 7, 2005

(65) Prior Publication Data

US 2006/0168040 A1    Jul. 27, 2006

(51) Int. Cl.
*G06F 15/16*    (2006.01)
(52) U.S. Cl. .................. 709/205; 709/203; 709/223; 709/232
(58) Field of Classification Search .......... 709/203, 709/205, 223, 232
See application file for complete search history.

(56) References Cited

U.S. PATENT DOCUMENTS

| | | | | |
|---|---|---|---|---|
| 6,549,950 B2 * | 4/2003 | Lytle et al. | ................... | 709/246 |
| 6,728,761 B2 * | 4/2004 | Decime | ...................... | 709/217 |
| 7,062,535 B1 * | 6/2006 | Stark et al. | ................... | 709/206 |
| 7,117,358 B2 * | 10/2006 | Bandini et al. | .............. | 713/153 |
| 7,321,922 B2 * | 1/2008 | Zheng et al. | ................ | 709/206 |
| 7,359,936 B2 * | 4/2008 | Gruen et al. | ................ | 709/203 |
| 2005/0223057 A1 * | 10/2005 | Buchheit et al. | ............ | 709/203 |
| 2005/0223058 A1 * | 10/2005 | Buchheit et al. | ............ | 709/203 |
| 2006/0101115 A1 * | 5/2006 | Gleckman | ................... | 709/203 |

* cited by examiner

*Primary Examiner*—Michael Won
(74) *Attorney, Agent, or Firm*—McGinn IP Law Group, PLLC; Gail H. Zarick

(57) ABSTRACT

A system for organizing email comprising: (a) a modeler operable to infer a temporal sequential process from a corpus of unlabeled email messages; and (b) a categorizer operable to accept an incoming message and map the aforesaid incoming message to a transition in the aforesaid temporal sequential process.

1 Claim, 3 Drawing Sheets

AUTOMATED EMAIL ACTIVITY MANAGEMENT

FIELD OF THE INVENTION

The present invention relates to a novel system for organizing email messages which correspond to business processes.

BACKGROUND OF THE INVENTION

Many structured activities are managed by email. For instance, a consumer purchasing an item from an e-commerce vendor may receive a message confirming the order, a warning of a delay, and then a shipment notification. Existing email clients do not understand this structure, forcing users to manage their activities by sifting through lists of messages.

Studies have shown that email has evolved from simply a communications medium to a "habitat"—the primary interface to one's workplace, supporting tasks such as activity management, meeting scheduling, and file transfer. Yet today's email applications are still oriented towards manipulating individual messages. Though email is increasingly used to communicate about tasks and activities, today's clients provide minimal support for managing those activities.

One important class of email-based activity is participation in a structured processes or workflows. Many email messages are a manifestation of a user's participation in a business process. For instance, an employee in an organization with a centralized hiring process receives automatically-generated messages reminding her of an upcoming interview, requesting feedback on the candidate after the interview, and notifying her of the final decision. A manager receives a series of messages when his employee requests a new computer, after the request has been approved by the financial approver, and when the machine is ready for delivery. A consumer purchasing an item from an e-commerce vendor may receive messages that confirm the order, or notification of a delay or that the items have been shipped.

It has long been recognized that people use email to manage ongoing tasks, to-do lists, and reminders, even though it was originally designed as a simple communications application. One approach to help people manage email more effectively is the ReMail system (S. Rohall, D. Gruen, P. Moody, M. Wattenberg, M. Stern, B. Kerr, B. Stachel, D. Kushal, R. Armes, and E. Wilcox. "Remail: A reinvented email prototype." In Proc. Conf. Human Factors in Computing Systems, 2004.), which explores better visualization techniques for displaying message threads, and uses simple text analysis to extract important dates and message summaries.

Others have proposed task-centric user interfaces, such as Taskmaster (V. Bellotti, N. Ducheneaut, M. Howard, and I. Smith. "Taking email to task: The design and evaluation of a task management centered email tool." In Proc. Conf. Human Factors in Computing Systems, 2003.) and TaskVista (V. Bellotti, B. Dalal, N. Good, P. Flynn, D. Bobrow, and N. Ducheneaut. "What a to-do: studies of task management towards the design of a personal task list manager." in Proc. Conf. Human Factors in Computing Systems, 2004.), which help people organize email and other online information into task-specific groupings. However, while these systems group messages together, they do so only using standard message headers.

SUMMARY OF THE INVENTION

The invention broadly and generally provides a system for organizing email comprising: (a) a modeler operable to infer a temporal sequential process from a corpus of unlabeled email messages; and (b) a categorizer operable to accept an incoming message and map the aforesaid incoming message to a transition in the aforesaid temporal sequential process.

Moreover, it is desirable that the aforesaid system comprises a visualizer operable to display a representation of the aforesaid temporal sequential process. The aforesaid visualizer is preferably operable to display a representation of a progression through the aforesaid temporal sequential process, the aforesaid progression comprising a change in the aforesaid temporal sequential process.

According to a preferred embodiment, the aforesaid system further comprises a predictor operable to predict a future message based on a progression through the aforesaid temporal sequential process. The system may further comprise a visualizer operable to display a representation of the aforesaid future message.

According to a preferred embodiment, the aforesaid modeler performs the steps of: (a) extracting a selected characteristic from each message; (b) creating at least one group containing at least one message which exhibits the aforesaid selected characteristics; and (c) adding an ungrouped message into a group selected from the aforesaid at least one group based on the temporal proximity of the aforesaid ungrouped message and messages within the aforesaid at least one group.

The invention further broadly and generally discloses a method for organizing email comprising the steps of: (a) inferring a temporal sequential process from a corpus of unlabeled email messages; and (b) accepting an incoming message and mapping the aforesaid incoming message to a transition in the aforesaid temporal sequential process. Moreover, it is desired that the method further comprise the step of displaying a representation of the aforesaid temporal sequential process on a visualizer.

The invention further broadly and generally discloses a program storage device readable by a digital processing apparatus and having a program of instructions which are tangibly embodied on the storage device and which are executable by the aforesaid digital processing apparatus to perform a method for organizing email, the method comprising the steps of: (a) inferring a temporal sequential process from a corpus of unlabeled email messages; and (b) accepting an incoming message and mapping the aforesaid incoming message to a transition in the aforesaid temporal sequential process. Moreover, it is preferable that the aforesaid method further comprises the step of displaying a representation of the aforesaid temporal sequential process on a visualizer.

The invention further broadly and generally discloses a method for deploying a software product for organizing the email of a client, the aforesaid software product being executable by a digital processing apparatus to carry out the steps of: (a) inferring a temporal sequential process from a corpus of unlabeled email messages; and (b) accepting an incoming message and mapping the aforesaid incoming message to a transition in the aforesaid temporal sequential process. Preferably, the aforesaid software product is executable by a digital processing apparatus to carry out the further step of displaying a representation of the aforesaid temporal sequential process on a visualizer.

DETAILED DESCRIPTION OF PREFERRED EMBODIMENT

Figure 1:
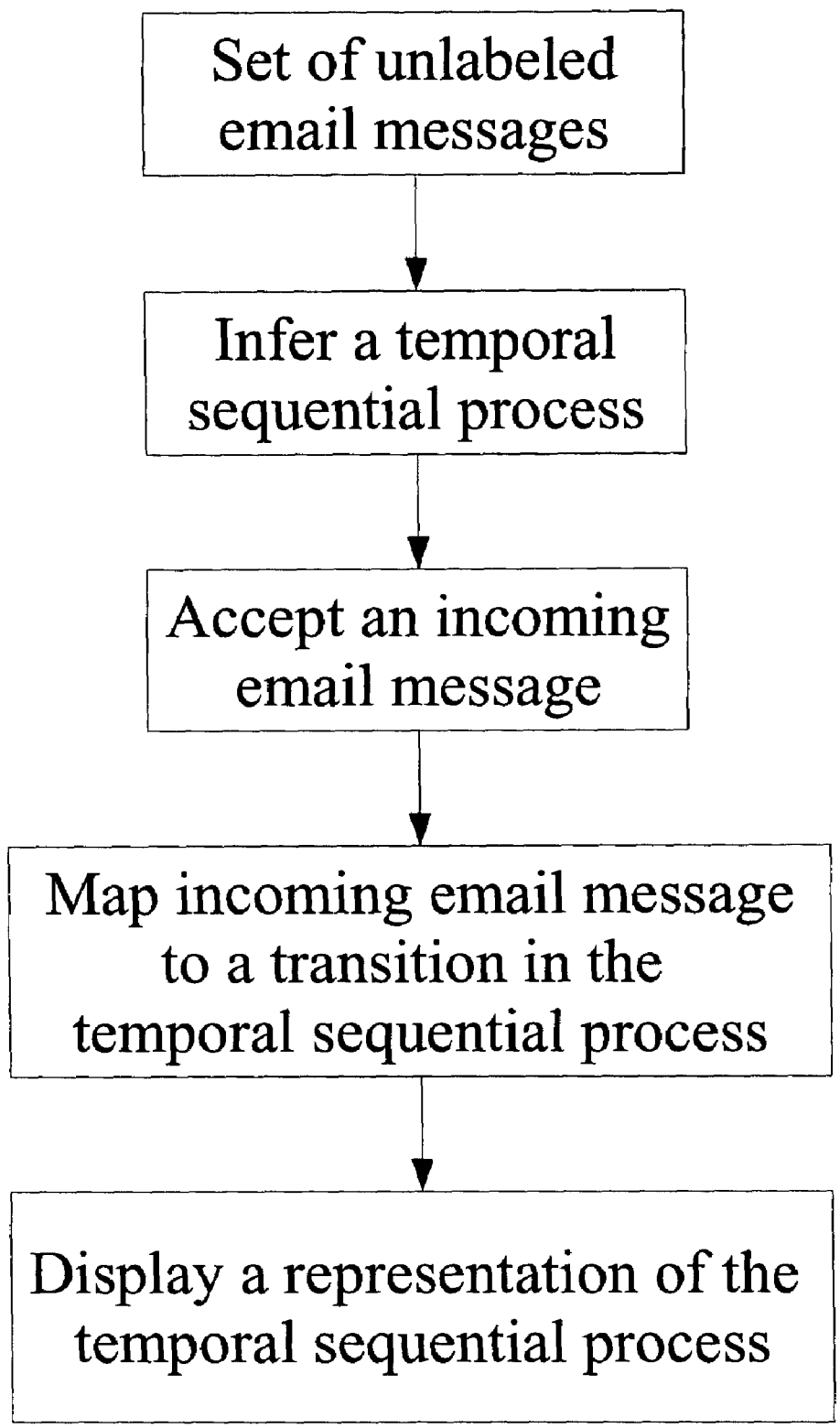
FIG. 1 shows a flowchart that schematically illustrates an exemplary embodiment of a method in accordance with the present invention.

FIG. 1 shows a flowchart that schematically illustrates a preferred embodiment of the method in accordance with the present invention. The method begins by inferring a temporal sequential process from a set of email messages.

After inferring a temporal sequential process, the present invention accepts an incoming message. In a preferred embodiment, the message may be accepted in typical fashion by an email reader.

After accepting an incoming message, the present invention maps the incoming message to a transition in the temporal sequential process. This mapping may be achieved using standard supervised learning techniques. In a preferred embodiment, a classifier is trained on M (a set of messages) based on a set of state transitions T over M.

After mapping the incoming message to a transition in the temporal sequential process, the present invention displays a representation of the temporal sequential process. In a preferred embodiment, the transition within the temporal sequential process will be highlighted to indicate which portion of the process corresponds to the incoming message.

Figure 2:
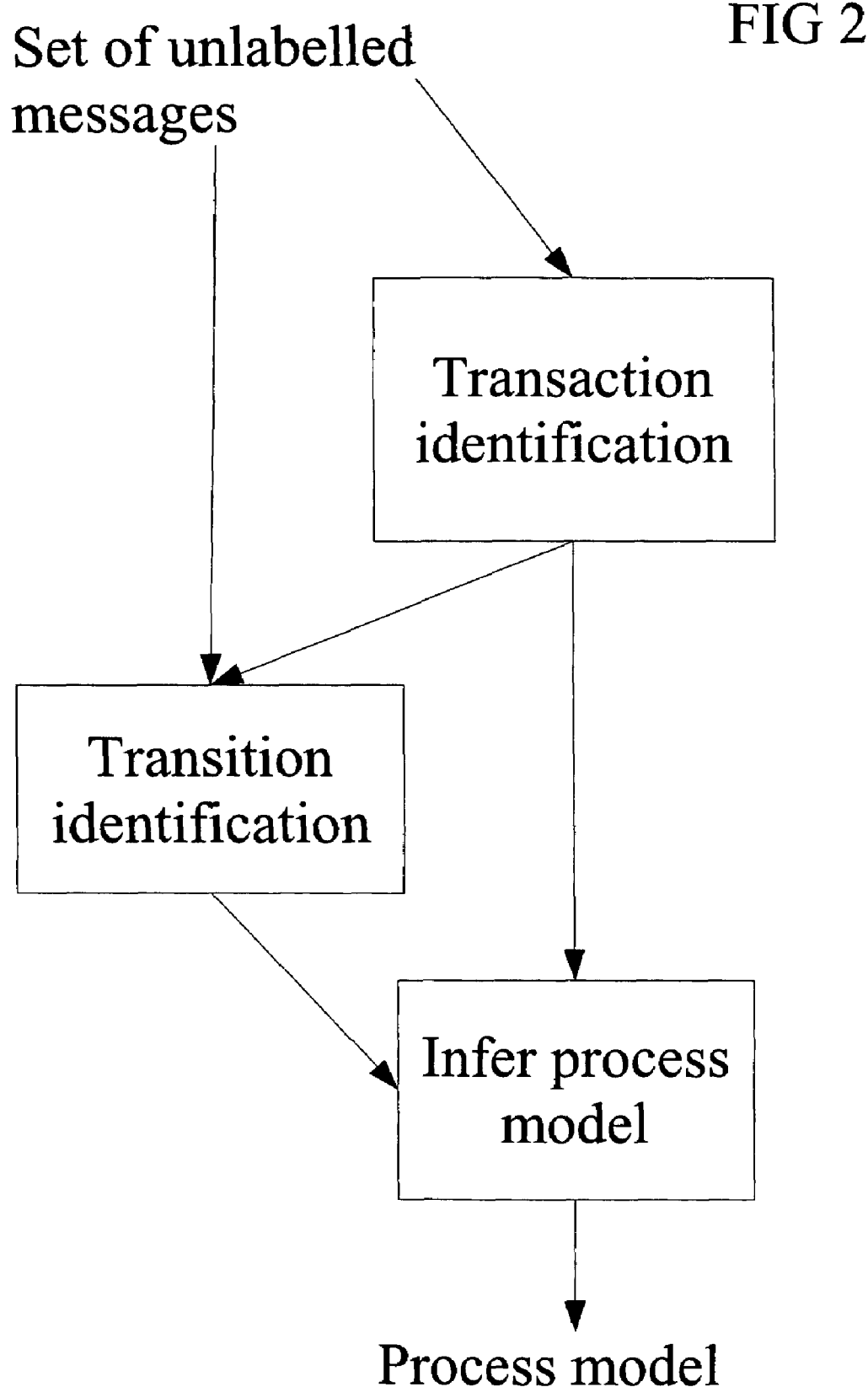
FIG. 2 shows a flowchart detail of an exemplary embodiment of the invention, as in the infer a temporal sequential process step in FIG. 1, where a process model of a temporal sequential process is discovered from a set of unlabeled messages.

FIG. 2 shows a flowchart detail of a step from the flowchart in FIG. 1 where a process model for a temporal sequential process is discovered from a set of unlabeled messages.

In an exemplary embodiment of the invention, a corpus of email messages is partitioned according to transactions (or distinct activities) which correspond to the messages. In one embodiment this is achieved by obtaining unique identifiers for transactions and sorting partitioning the messages according to the identifiers. Unique identifiers for transactions are obtained by searching for all sequences of alphanumeric characters and discarding obvious mistakes such as dates, telephone numbers and credit card numbers. Messages are then segmented according to transactions by first sorting the messages chronologically, then segmenting them into transactions by repeatedly selecting the next unclaimed message and combining it with other messages sharing a unique identifier. In a preferred embodiment, a variable K is used to control the permissible amount of overlap of different transactions (transactions may overlap by at most K messages). Messages which do not contain unique identifiers may be merged with "nearby" transactions, where the term "nearby" is qualified by some function of the usual interval between messages within the same transaction.

Figure 3:
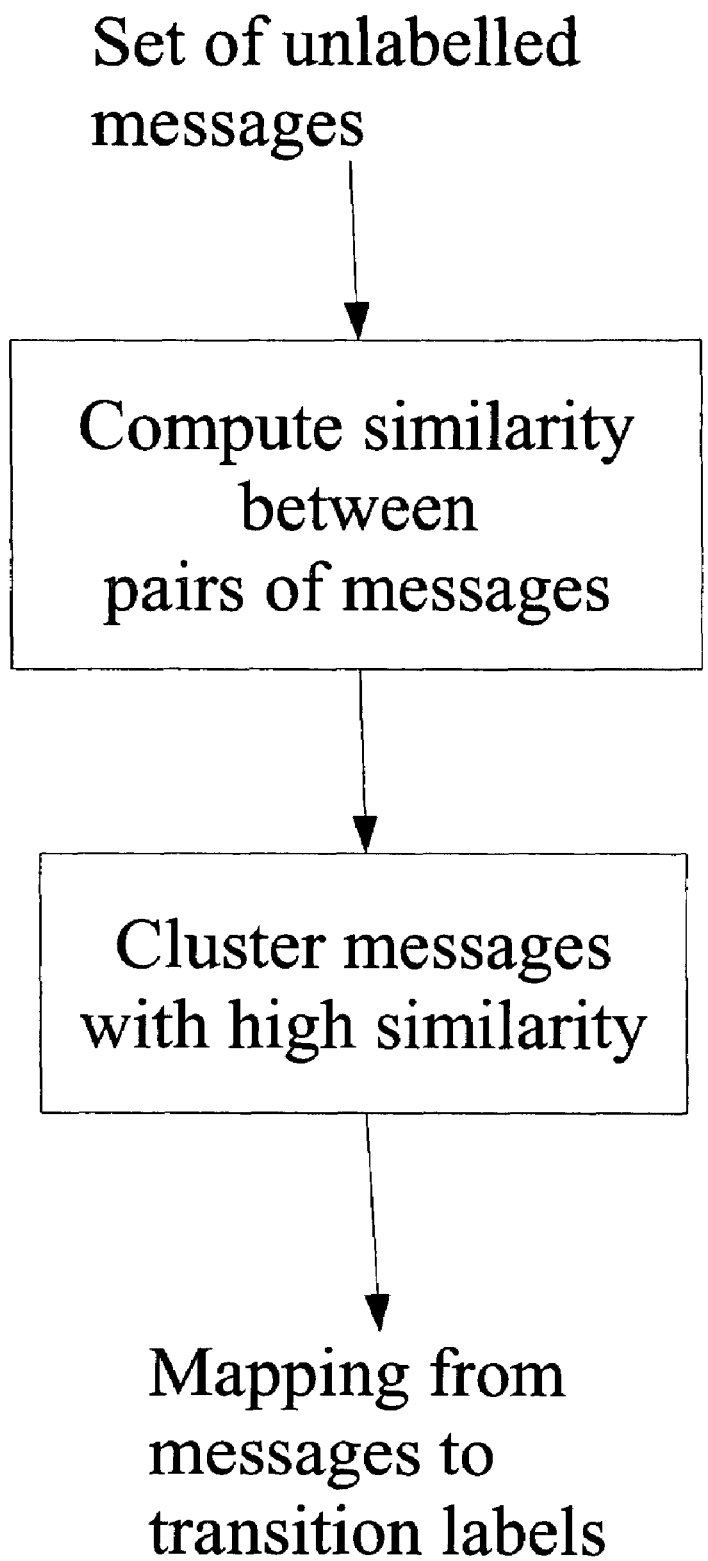
FIG. 3 shows a flowchart detail of an exemplary embodiment of the invention for transition identification, as in FIG. 2, where a set of unlabeled messages is used to create a mapping from messages to transition labels.

Transitions correspond to different messages within the same transaction and can be identified by defining the distance between every pair of messages and employing a clustering algorithm to partition the messages, creating a mapping from messages to transition labels as in FIG. 3. In a preferred embodiment, this distance is defined as the length of the longest common subsequence of characters between pairs of messages.

A process model for the temporal sequential process is inferred. A process model may take many forms including that of a context free grammar. In a preferred embodiment, the process model takes the form of a regular grammar and can be inferred by treating the task of discovering a process model like that of learning a regular grammar from positive examples. For example, Thollard et al's MDI algorithm may be used for learning an automaton from positive examples. In a preferred embodiment, a stochastic process model representing the temporal sequential process is converted into a deterministic process model.

While changes and variations to the embodiments may be made by those skilled in the field, the scope of the invention is to be determined by the appended claims.

What is claimed is:

1. A system for organizing email, comprising:
    a modeler operable to infer a temporal sequential process from a corpus of unlabeled email messages,
        wherein said temporal sequential process comprises a finite state machine;
    a categorizer operable to accept an incoming message and map said incoming message to a transition in said temporal sequential process;
    a first visualizer operable to display a representation of said temporal sequential process,
        wherein said visualizer is operable to display a representation of a progression through said temporal sequential process, said progression comprising a change in said temporal sequential process;
    a predictor operable to predict a future message based on a progression through said temporal sequential process; and
    a second visualizer operable to display a representation of said future message,
    wherein said modeler performs:
        extracting a selected characteristic from each message;
        creating at least one group containing at least one message which exhibits said selected characteristics; and
        adding an ungrouped message into a group selected from said at least one group based on the temporal proximity of said ungrouped message and messages within said at least one group.

* * * * *